(12) United States Patent
Nowastowski-Stock (10) Patent No.: US 12,040,602 B2
(45) Date of Patent: Jul. 16, 2024

(54) CABLE SCREW CONNECTION

(71) Applicant: CONTA-CLIP VERBINDUNGSTECHNIK GMBH, Hövelhof (DE)

(72) Inventor: Jörg Nowastowski-Stock, Detmold (DE)

(73) Assignee: CONTA-CLIP VERBINDUNGSTECHNIK GMBH, Hövelhof (DE)

( * ) Notice: Subject to any disclaimer, the term of this patent is extended or adjusted under 35 U.S.C. 154(b) by 228 days.

(21) Appl. No.: 17/295,936

(22) PCT Filed: Nov. 29, 2019

(86) PCT No.: PCT/DE2019/101021
§ 371 (c)(1),
(2) Date: May 21, 2021

(87) PCT Pub. No.: WO2020/108706
PCT Pub. Date: Jun. 4, 2020

(65) Prior Publication Data
US 2021/0399538 A1 Dec. 23, 2021

(30) Foreign Application Priority Data
Nov. 29, 2018 (DE) ...................... 20 2018 106 798.2

(51) Int. Cl.
*H02G 3/22* (2006.01)
(52) U.S. Cl.
CPC ..................... *H02G 3/22* (2013.01)
(58) Field of Classification Search
CPC .. H02G 3/22; H02G 3/18; H02G 3/00; H02G 3/24; H02G 3/26; H02G 3/36;
(Continued)

(56) References Cited

U.S. PATENT DOCUMENTS 4,145,075 A * 3/1979 Holzmann ........... H02G 3/0658
285/322
4,250,348 A * 2/1981 Kitagawa .................. F16L 5/06
285/322
(Continued)

FOREIGN PATENT DOCUMENTS

CN 1973410 A 5/2007
CN 102345661 A 2/2012
(Continued)

OTHER PUBLICATIONS

International Search Report and Written Opinion of the International Searching Authority, issued in PCT/DE2019/101021, mailed Feb. 10, 2020; ISA/EP.

*Primary Examiner* — Angel R Estrada
(74) *Attorney, Agent, or Firm* — Harness, Dickey & Pierce, P.L.C.

(57) ABSTRACT

The invention relates to a cable screw connection having a cable leadthrough housing which is formed in two parts from a first housing component (10) and a second housing component (11), which components are arranged, during assembly, at a wall aperture on opposite sides of the wall aperture and are releasably connected to one another in order to clamp between them a wall portion surrounding the wall aperture; a cable passage which is formed through the cable leadthrough housing when the first and second housing components (10, 11) are connected to one another; and a cable seal which is formed on the cable leadthrough housing with a sealing body (19) which is formed around the cable passage and accommodates a cable received therein in a sealing manner; wherein the cable leadthrough housing and the sealing body (19) are made of different synthetic materials and the sealing body (19) is formed.

12 Claims, 10 Drawing Sheets

(58) Field of Classification Search
CPC .... H02G 15/00; H02G 15/003; H02G 15/007; H02G 15/013; H02G 15/04; H02G 15/043; H02G 15/08; H02G 15/20; H02G 15/23; F16L 21/06; F16L 21/00; F16L 21/02; F16L 25/02
USPC ....... 174/656, 480, 481, 650, 659, 660, 665, 174/668, 669, 68.1, 135, 74 A; 285/256, 285/257, 319, 322, 323, 331; 403/404
See application file for complete search history.

(56) References Cited

U.S. PATENT DOCUMENTS

| | | | | |
|---|---|---|---|---|
| 4,358,079 | A * | 11/1982 | Navarro | H02G 3/22 |
| | | | | 174/665 |
| 4,525,000 | A * | 6/1985 | Bachle | H02G 3/0675 |
| | | | | 174/653 |
| 4,767,135 | A * | 8/1988 | Holzmann | H02G 3/0658 |
| | | | | 285/322 |
| 4,787,657 | A * | 11/1988 | Henniger | H02G 3/0658 |
| | | | | 174/660 |
| 4,891,470 | A * | 1/1990 | Studenski | H02G 3/0675 |
| | | | | 174/653 |
| 5,048,872 | A * | 9/1991 | Gehring | H02G 3/0675 |
| | | | | 411/269 |
| 5,350,204 | A * | 9/1994 | Henniger | F16L 5/08 |
| | | | | 174/665 |
| 5,378,027 | A * | 1/1995 | Gehring | H02G 3/0675 |
| | | | | 285/354 |
| 5,405,172 | A * | 4/1995 | Mullen, Jr. | F16L 5/06 |
| | | | | 285/343 |
| 5,600,094 | A * | 2/1997 | McCabe | H02G 3/0616 |
| | | | | 174/653 |
| 5,866,853 | A * | 2/1999 | Sheehan | H02G 3/0675 |
| | | | | 174/653 |
| 6,009,610 | A | 1/2000 | Brandolf | |
| 6,488,317 | B1 | 12/2002 | Daoud | |
| 7,563,993 | B2 * | 7/2009 | Drotleff | H02G 15/007 |
| | | | | 174/653 |
| 9,127,785 | B2 * | 9/2015 | Charcenko | F16L 5/06 |
| 10,483,742 | B2 * | 11/2019 | Naumann | H02G 3/22 |

FOREIGN PATENT DOCUMENTS

| | | |
|---|---|---|
| CN | 105610102 A | 5/2016 |
| DE | 7522286 U | 1/1976 |
| DE | 102004027255 A1 | 12/2005 |
| EP | 1220407 A2 | 7/2002 |
| EP | 1780854 A1 | 5/2007 |
| EP | 2852015 A1 | 3/2015 |
| JP | H09284954 A | 10/1997 |
| JP | 2017225255 A | 12/2017 |
| JP | 2018152941 A | 9/2018 |

* cited by examiner

CABLE SCREW CONNECTION

CROSS-REFERENCE TO RELATED APPLICATIONS

This application is a 371 U.S. National Stage of International Application No. PCT/DE2019/101021, filed on Nov. 29, 2019, which claims priority to German Application No. 20 2018 106 798.2, filed on Nov. 29, 2018. The entire disclosures of the above applications are incorporated herein by reference.

The invention relates to a cable screw connection for leading a cable through a wall opening.

BACKGROUND

Such cable screw connections are used to lead one or more cables through an opening in a wall, for example through a housing wall of an electrical device or a control cabinet. In principle, such cable screw connections can be used with any housings that are made of a metal or plastics material, for example. The cable is usually led through the wall in a sealed manner, in particular to the effect that dirt and/or moisture is prevented from entering through the wall opening.

Known cable screw connections are made in several parts, in such a way that, in a cable lead-through housing, screwed-together housing parts are provided for arrangement on opposite sides of the wall opening. To form the cable screw connection, the housing parts are arranged on opposite sides of the wall opening and connected to one another through the wall opening by producing a screw connection. In addition, one or more sealing bodies are provided which are integrated when the housing components are screwed together in order to form a seal for the cable led through the lead-through housing.

SUMMARY

The object of the invention is to provide a cable screw connection that can be assembled in a simple manner.

In order to achieve said object, a cable screw connection according to independent claim 1 is provided. Embodiments are the subject matter of dependent claims.

According to one aspect, a cable screw connection is provided, which has a cable lead-through housing, is formed from a first housing component and a second housing component, which, when mounted on a wall opening, are arranged on opposite sides of the wall opening and releasably connected to one another, in order to clamp a wall section surrounding the wall opening therebetween. The cable screw connection also has a cable passage, which is formed through the cable lead-through housing when the first and second housing components are connected to one another, for example releasably. A cable seal is provided, which is formed on the cable lead-through housing with a sealing body, which is formed around the cable lead-through and sealingly accommodates a cable received therein. The cable lead-through housing and the sealing body are made of different plastics materials, wherein the sealing body is integrally formed on the cable lead-through housing.

If the cable lead-through housing for forming the cable screw connection or cable wall lead-through is mounted on the wall opening and at least one cable is arranged in the cable lead-through, a circumferential contact can be formed for the sealing body with the at least one cable in order to provide a sealing effect. When the first and second housing components are connected, the sealing body is pressed and thus deformed in order to develop the sealing effect. A releasable connection of the housing components can be carried out, for example, by means of a screw connection or a clip connection. In the case of the screw connection, the first housing component can be designed as a screw-in body and the second component as a pressure screw, into which a section of the screw-in body is screwed when connecting the housing components.

While the cable lead-through housing consists of the two housing components, further components can be provided to form the cable screw connection, for example at least one washer, which can be pushed or slipped onto a section of the first housing component, which is optionally provided with an external thread. The washer can then rest on an edge surrounding the wall opening when the two housing components are connected.

The sealing body can be integrally formed on the first housing component. When connecting the two housing components, compressive pressure can be exerted on the sealing body, in order to develop the sealing effect.

The sealing body can be integrally formed on the end of the first housing component in an end section, which is arranged in the second housing component, when the first and the second housing component are connected to one another. The sealing body can be integrally formed on the first housing component at an end section on the front side, in such a way that when the housing components are connected, the second housing component presses against the front sealing body.

The sealing body can encompass the end section of the first housing component in one piece on the outside and inside. The outside and inside encompassing of the end section, for example a front side section, can be interrupted or continuous on the circumference.

The sealing body can be integrally formed on the second housing component. In this embodiment, the sealing body is integrally formed on the second housing component. For example, the sealing body can be integrally formed on the inside of the second housing component. The sealing body can be arranged in relation to the wall opening on a distal end section of the second housing component. When connecting the first and second housing components, for example by screwing them together, the first housing component can then press against the inner sealing body.

The sealing body can be designed in several parts, in particular in such a way that a first sealing body is integrally formed on the first housing component and a second sealing body on the second housing component. When connecting the first and the second housing component, the first and the second sealing body can come to rest or come into contact with one another, in order to jointly form the seal for the at least one cable in the cable passage. In one embodiment, a projection formed on the first sealing body, for example a sealing lip, can engage in a recess formed on the second sealing body, for example a groove, when the two housing components are connected to form the cable lead-through housing.

The sealing body can be integrally formed on the inside of the second housing component adjacent to a front-side opening of the second housing component that is distal with respect to the wall opening, in such a way that when the first and second housing components are connected, a front-side pressing section of the first housing component is pressed against the sealing body. The sealing body can encompass the distal front-side opening continuously or interrupted.

On the outside of the first housing component a threaded section can be arranged which is assigned to the wall opening, which threaded section can be screwed into the wall opening. The external thread on the first housing component, which can be designed as a screw-in body, for example, can be used to screw the first housing component into the wall opening. Alternatively, a section of the first housing component that extends through the wall opening can reach through the wall opening (loosely) without a screw connection being formed in the process. For example, the housing section of the first housing component can simply be pushed through the wall opening, in order to be connected to the second housing component on the opposite side, for example by means of a screw connection. In one example, after being pushed through the wall opening, the first housing component can initially be fastened or clamped to it by means of a lock nut, in order to subsequently screw on the second housing component.

On the outside of the first housing component, a conical plug-in section assigned to the wall opening can be arranged, which can be inserted into the wall opening. With the help of the one or more conical plug-in sections, the first housing component can be clamped when it is inserted into the wall opening, in particular when connecting to the second housing component, if this is screwed onto the first housing component in one embodiment, in order to clamp the edge surrounding the wall opening between the two housing components. By means of the force provided when connecting the two housing components, the first housing component with the conical plug-in section can be pulled further into the wall opening. On the outside of the first housing component, a plurality of conical sections can be provided in a circumferentially distributed manner. A conical projection that is continuously formed all the way around can also be provided.

As a soft component, the sealing body can be made of a thermoplastic elastomer. The first and/or the second housing component can be designed as a 2C injection-molded component for the one-piece molding of the sealing body. The cable lead-through housing, that is to say the first and/or the second housing component, forms a hard component made of a harder plastics material than the sealing body, which forms the soft component made of the thermoplastic elastomer.

The cable seal can be designed to form a cable strain relief. In this embodiment, a multifunctional sealing body is provided which, in addition to the seal, also forms cable strain relief when the first and second housing components are connected to one another.

A further sealing body which seals the wall opening and which is integrally formed on the cable lead-through housing can be arranged on the cable lead-through housing.

The second housing component can have a screw cap with an internal thread, which can be screwed onto an external thread of the first housing component and thereby presses the sealing body.

In conjunction with the cable screw connection, a method for producing a cable screw connection can be provided in which a two-piece cable lead-through housing is produced by arranging a first housing component and a second housing component, which make up the cable lead-through housing, on opposite sides of a wall opening during installation on the wall opening and are connected to one another (releasably) so that a wall section (edge) surrounding the wall opening is clamped therebetween. In a cable passage or a cable lead-through, which is formed through the cable lead-through housing when the first and the second housing component are connected to one another, at least one cable to be guided through the wall opening is arranged. The at least one cable is sealed with the aid of a cable seal, which is formed on the cable lead-through housing with a sealing body, which is formed around the cable passage and sealingly accommodates the cable arranged therein. To produce the cable screw connection, a cable lead-through housing and a sealing body made of different plastics materials are used, wherein the sealing body is integrally formed on the cable lead-through housing. The first housing component can be fastened or clamped to the wall in the area of the wall opening, if necessary, by means of a lock nut which is screwed onto the first housing component after it has been inserted into the wall opening and has been pushed through it with a front section.

In the method, the first housing component can initially be inserted into the wall opening from an inside or an outside of the wall with the wall opening (and pushed through in sections), then the second housing component, for example a screw cap or pressure screw, can be screwed on from the opposite side.

DESCRIPTION OF EMBODIMENTS

Further embodiments are explained in greater detail below with reference to the drawings, in which.

Figure 1:
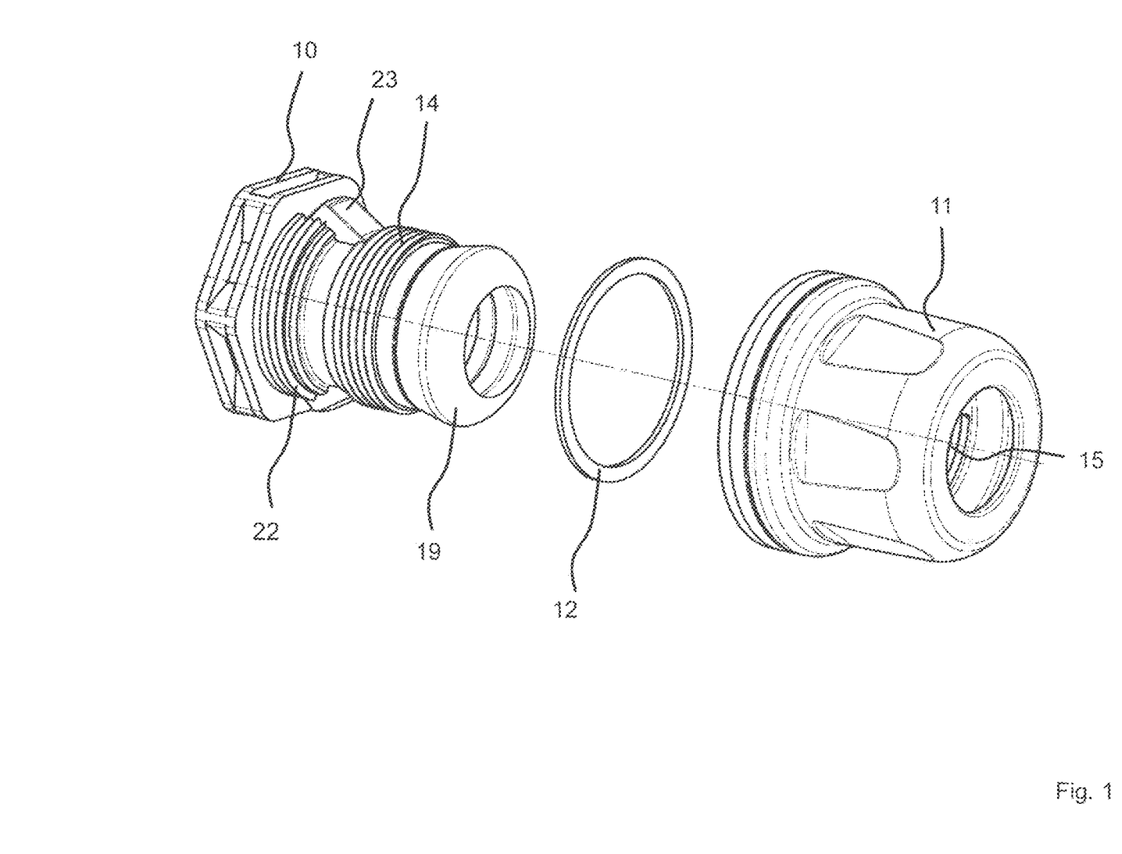
FIG. 1 shows a schematic perspective illustration of housing components for a cable lead-through housing and a washer for a cable screw connection in the unassembled state.
Figure 2:
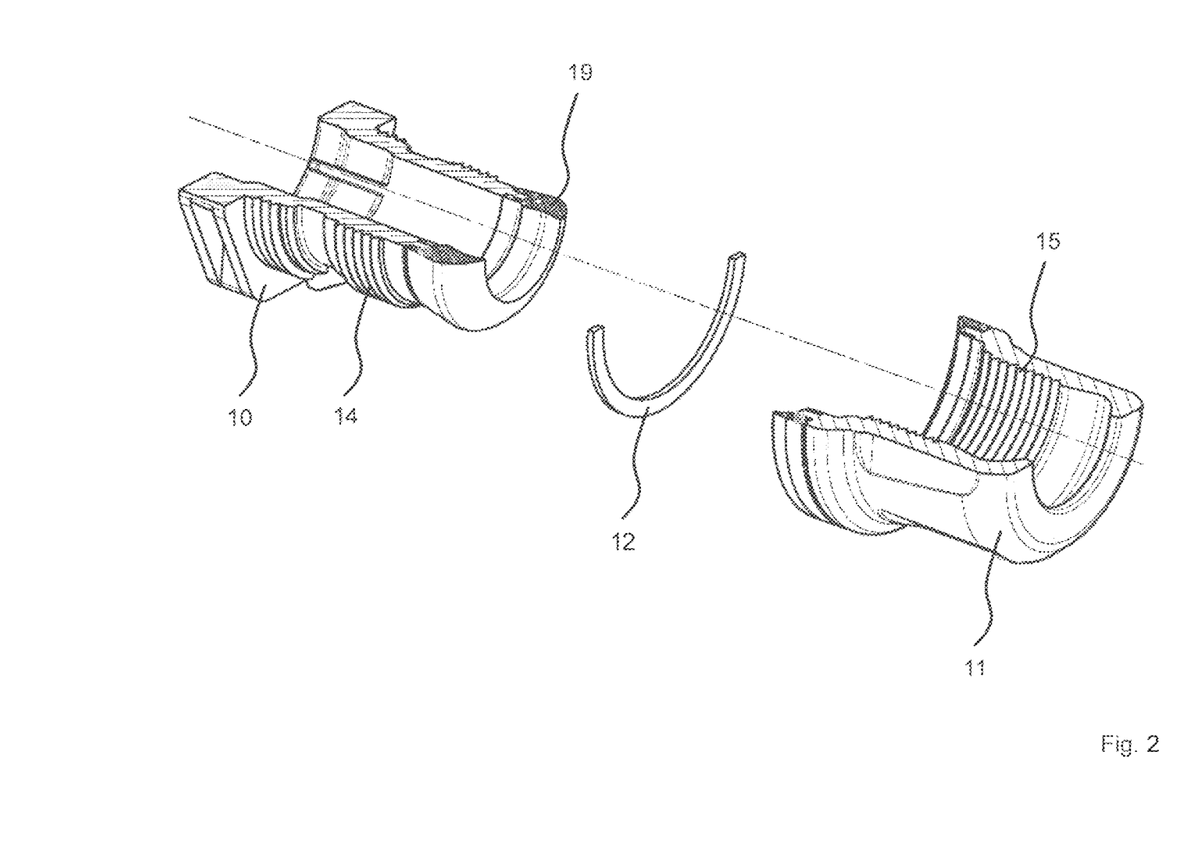
FIG. 2 shows a further perspective illustration of the arrangement according to FIG. 1 in cutaway view.
Figure 3:
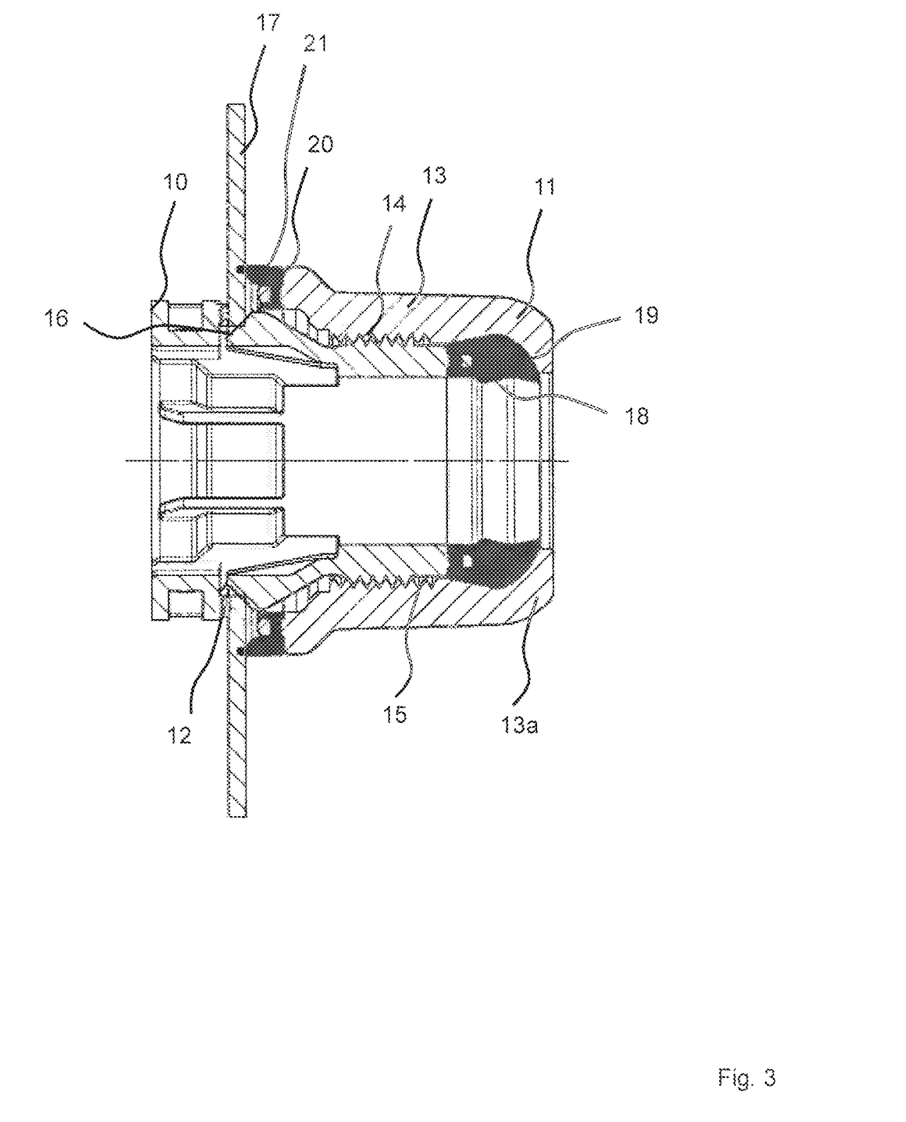
FIG. 3 shows a schematic representation of a cable screw connection with the housing components from FIG. 1 in cutaway view.
Figure 4A:
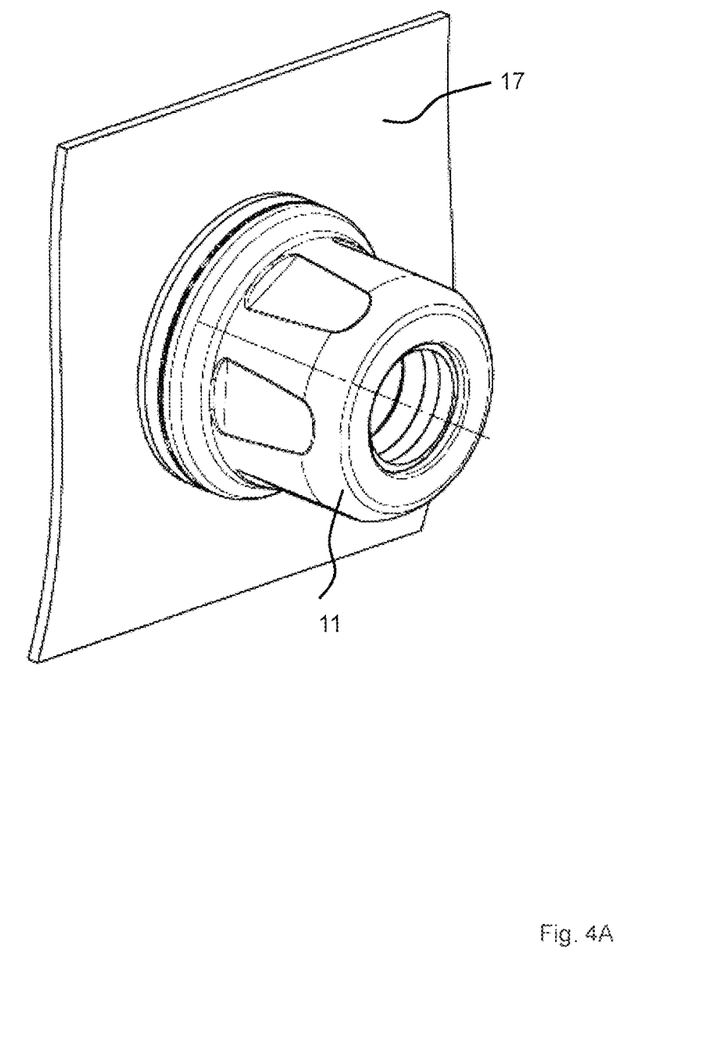
FIGS. 4A and 4B show schematic perspective illustrations of the cable screw connection from FIG. 3.
Figure 4B:
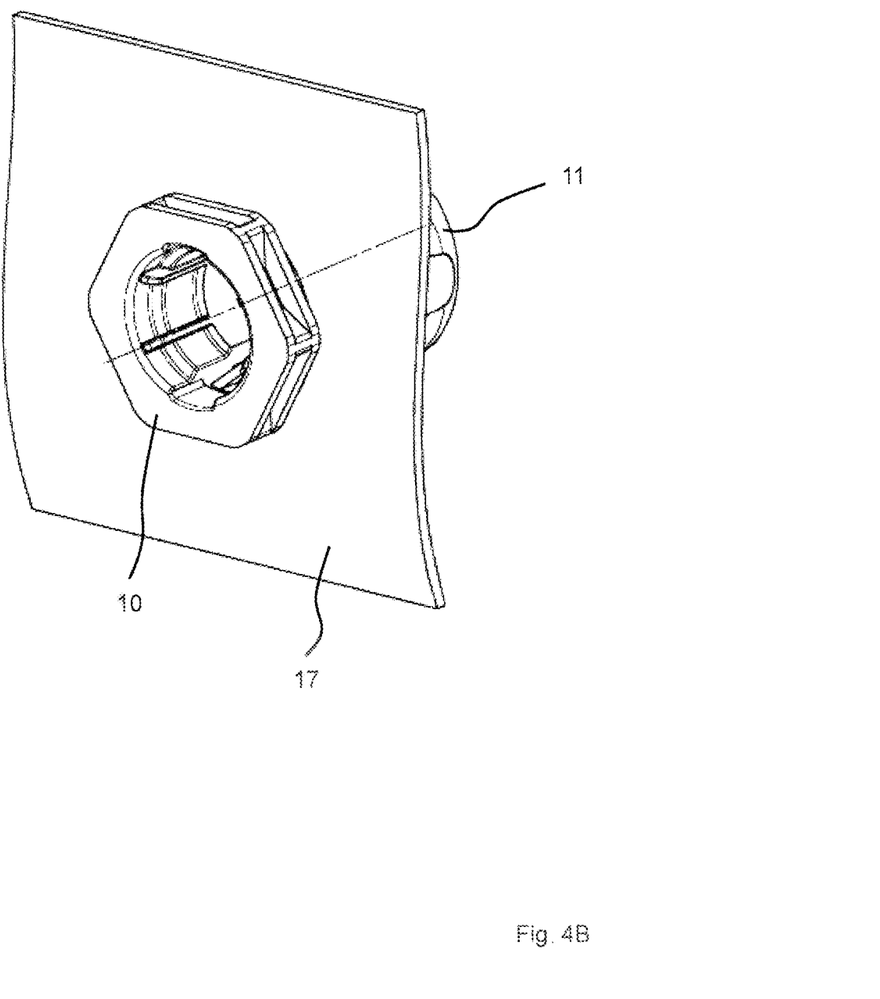
Figure 5:
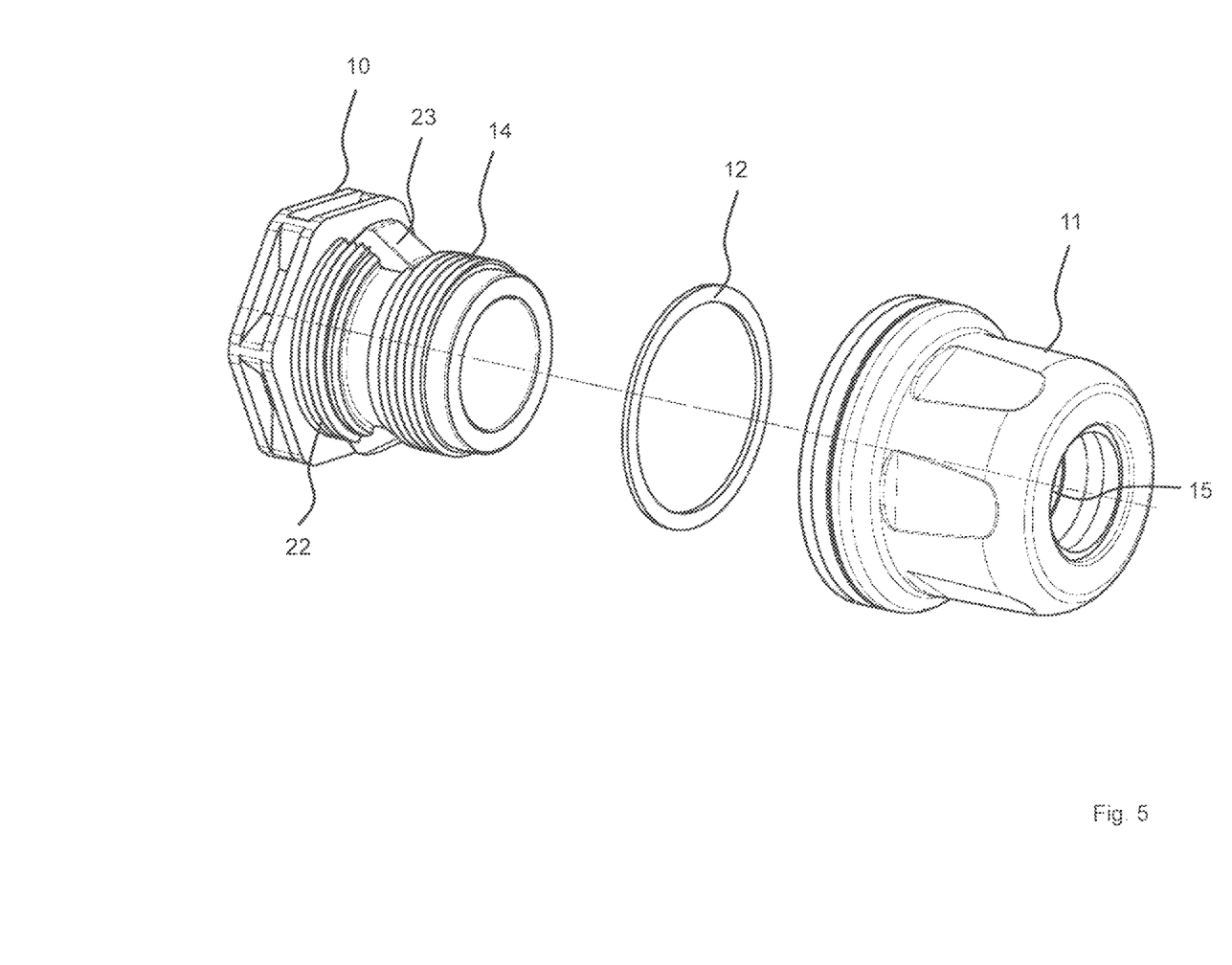
FIG. 5 shows a schematic perspective illustration of housing components for a further cable lead-through housing and a washer for a further cable screw connection in the unassembled state.

FIG. 1 shows a schematic perspective illustration of a first and a second housing component 10, 11 and a washer 12, which can be used to produce a cable screw connection or cable wall lead-through 13 with a cable lead-through housing 13a from the first and second housing components 10, 11, as shown in FIGS. 3 and 4A, 4B. FIG. 2 shows a further schematic perspective illustration of the arrangement from FIG. 1 in section.

The first and the second housing component 10, 11 are each made of a plastics material, for example as an injection molded component. In the embodiment shown, the first housing component 10 is designed as a screw-in body, in which the second housing component 11, designed as a pressure screw with an internal thread 15, is screwed onto an external thread 14 (cf. FIG. 3). As a result, the cable screw connection 13 shown in FIG. 3 is formed, which is arranged in the area of a wall opening 16 of a wall 17, in order to lead one or more cables (not shown) through the wall opening 16 in a sealing manner.

To form the seal for the at least one cable, a sealing body 19 is provided for a cable seal 18, which is integrally formed as a soft component on the first housing component 10, for example by means of 2C injection. For example, the sealing body 19 consists of a thermoplastic elastomer. When connecting the first and the second housing component 10, 11, which is carried out in the illustrated embodiment by means of screwing, the second housing component 11 presses against the sealing body 19, so that it is pressed toward the center of a cable passage 18, in order to circumferentially contact and seal the at least one cable.

A further sealing body 21 is integrally formed on the second housing component 11 in the area of an end face 20 assigned to the wall 17, which forms a seal toward the wall 17 when the second housing component 11 is screwed onto the first housing component 10 to form the cable screw connection 13.

According to FIG. 1, the first housing component 10 has a further externally threaded section 22, which is screwed into the wall opening 16 when the cable screw connection 13 is formed. In addition, conical plug-in sections 23 are provided, in order to clamp the first housing component 10 in the wall opening 16.

In FIGS. 5 to 8, a further cable screw connection 30 with the cable lead-through housing 13a is shown. The same reference signs as in FIGS. 1 to 4 are used for the same features.

Figure 6:
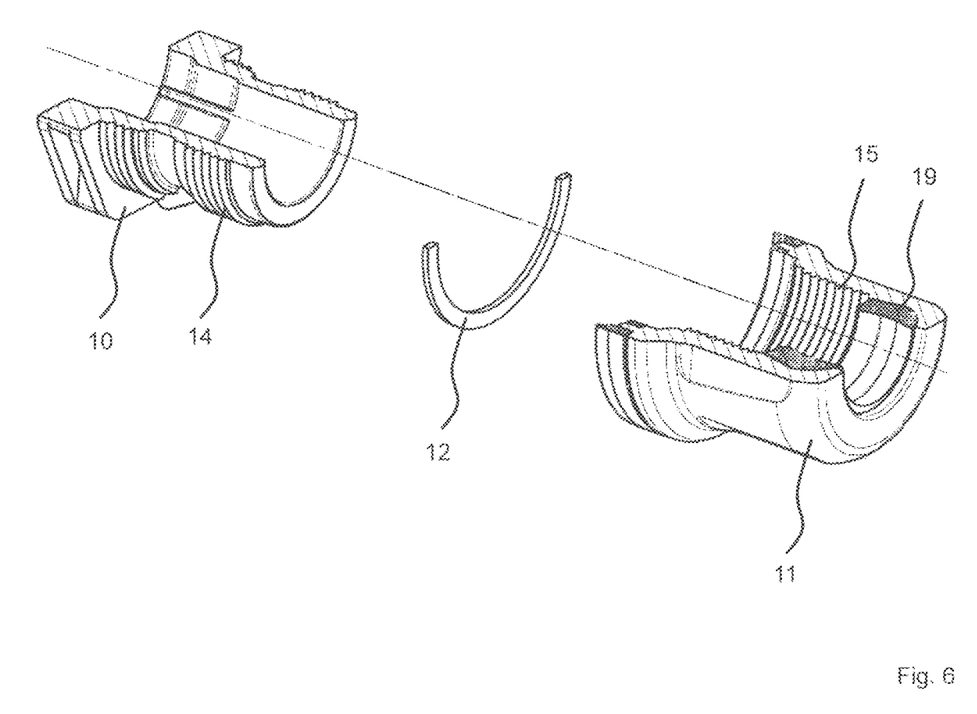
FIG. 6 shows a further perspective illustration of the arrangement according to FIG. 5 in cutaway view.
Figure 7:
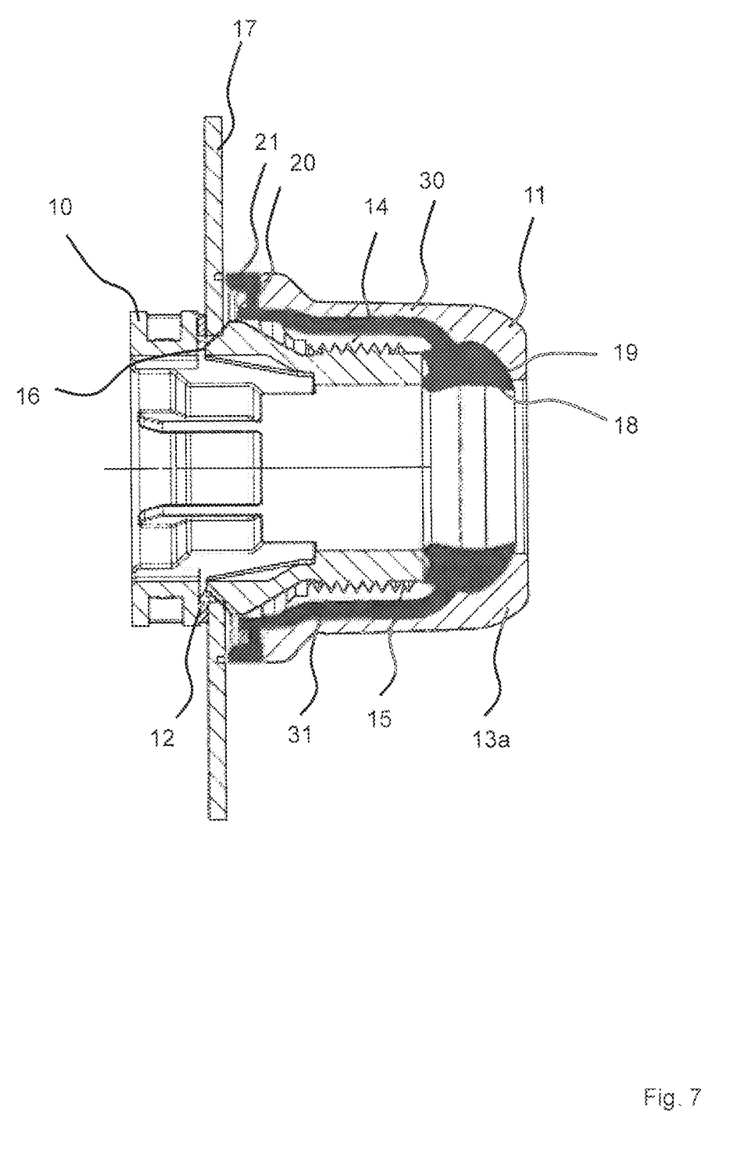
FIG. 7 shows a schematic illustration of a further cable screw connection with the housing components from FIG. 5 cutaway view.
Figure 8A:
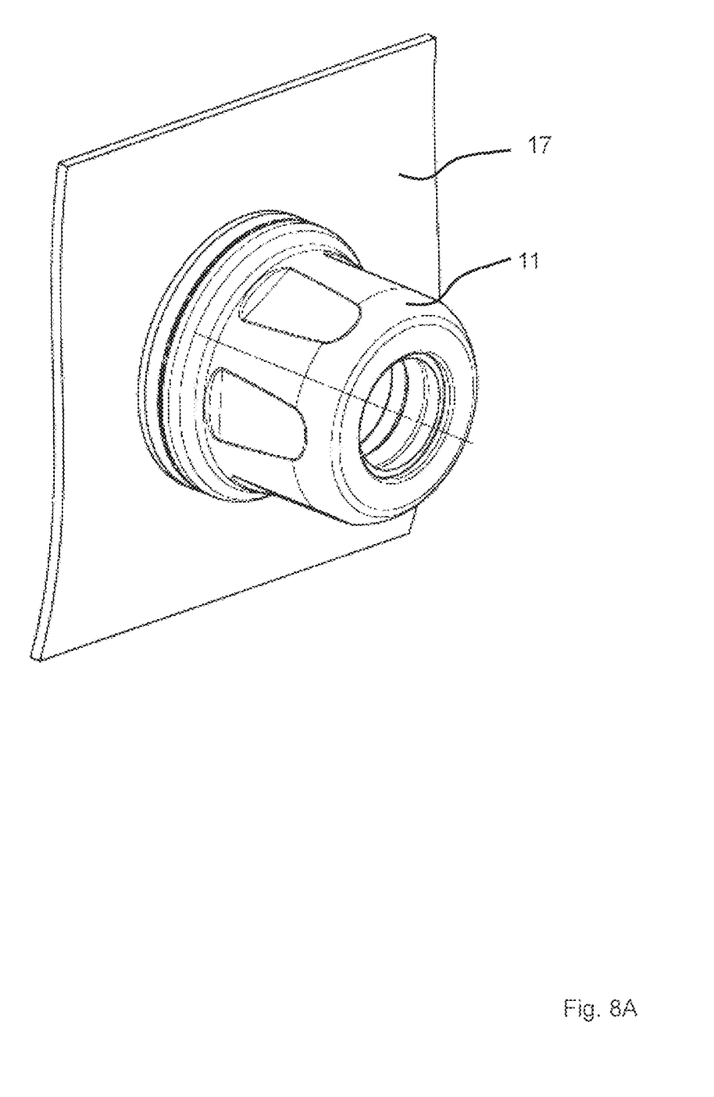
FIGS. 8A and 8B show schematic perspective illustrations of the further cable screw connection from FIG. 7.
Figure 8B:
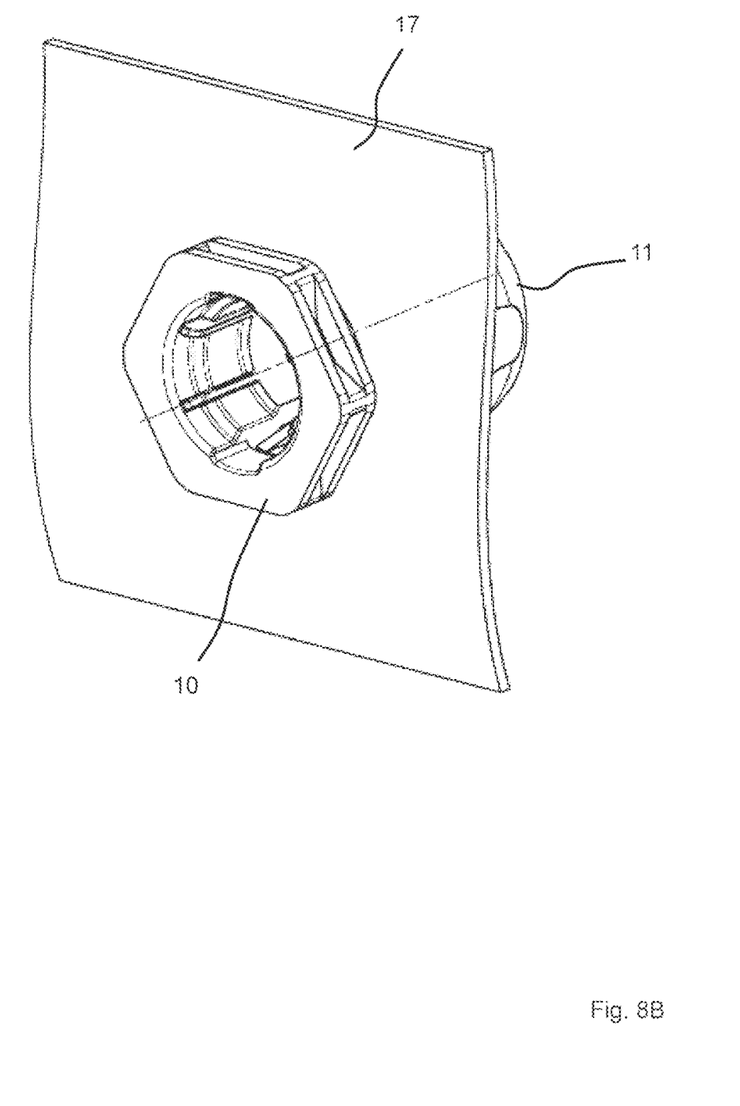

In contrast to the examples in FIGS. 1 to 4, the sealing body 19 is now integrally formed on the inside of the second housing component 11 (cf. FIGS. 6 and 7).

According to FIG. 7, in the example shown there, the sealing body 19 and the further sealing body 21 are connected via a channel 31, which is filled with the material, from which the sealing body 19 and the further sealing body 21 are also made. If the second housing component 11 for the further cable screw connection 30 is produced by injection molding, the material for the sealing bodies 19, 21 can be introduced via an opening in the injection molding tool in order to form both sealing bodies 19, 21, wherein the material propagation, for example, of the soft component such as thermoplastic elastomer, takes place via the channel 31. Along the circumference of the second housing component 11, a plurality of separate channels can be provided like the channel 31 (cf. also FIG. 7).

The features disclosed in the above description, the claims and the drawing may be relevant to implementing the different embodiments both individually and also in any combination.

The invention claimed is:

1. Cable screw connection, with:
   a cable lead-through housing, which is formed in two pieces from a first housing component and a second housing component which, when mounted on a wall opening, are arranged on opposite sides of the wall opening and are releasably connected to one another, in order to clamp a wall section surrounding the wall opening therebetween;
   a cable passage, which is formed through the cable lead-through housing when the first and second housing components are connected to one another; and
   a cable seal, which is formed on the cable lead-through housing with a sealing body which is formed around the cable passage to sealingly receive a cable therein, wherein when the first and second housing components are connected, the sealing body is pressed and thus deformed in order to develop a sealing effect;
   wherein the cable lead-through housing and the sealing body are made of different plastics materials and the sealing body is integrally formed on the cable lead-through housing.

2. Cable screw connection according to claim 1, wherein the sealing body is integrally formed on the first housing component.

3. Cable screw connection according to claim 2, wherein the sealing body is integrally formed on the end of the first housing component in an end section which is arranged in the second housing component when the first and the second housing component are connected to one another.

4. Cable screw connection according to claim 3, wherein the sealing body encompasses the end section of the first housing component in one piece on the outside and inside.

5. Cable screw connection according to claim 1, wherein a threaded section assigned to the wall opening is arranged on the outside of the first housing component, which threaded section can be screwed into the wall opening.

6. Cable screw connection according to claim 1, wherein on the outside of the first housing component a conical plug-in section assigned to the wall opening is arranged, which can be plugged into the wall opening.

7. Cable screw connection according to claim 1, wherein the sealing body, as a soft component, is made of a thermoplastic elastomer.

8. Cable screw connection according to claim 1, wherein the cable seal is designed to form a cable strain relief.

9. Cable screw connection according to claim 1, wherein a further sealing body sealing the wall opening is arranged on the cable lead-through housing and is integrally formed on the cable lead-through housing.

10. Cable screw connection according to claim 1, wherein the second housing component has a screw cap with an internal thread which can be screwed onto an external thread of the first housing component and thereby presses the sealing body.

11. Cable screw connection, with:
   a cable lead-through housing, which is formed in two pieces from a first housing component and a second housing component which, when mounted on a wall opening, are arranged on opposite sides of the wall opening and are releasably connected to one another, in order to clamp a wall section surrounding the wall opening therebetween;
   a cable passage, which is formed through the cable lead-through housing when the first and second housing components are connected to one another; and
   a cable seal, which is formed on the cable lead-through housing with a sealing body which is formed around the cable passage to sealingly receive a cable therein;
   wherein the cable lead-through housing and the sealing body are made of different plastics materials and the sealing body is integrally formed on the cable lead-through housing, and wherein the sealing body is integrally formed on the second housing component.

12. Cable screw connection according to claim 11, wherein the sealing body is integrally formed on the second housing component on the inside adjacent to an end-face opening of the second housing component which is distal with respect to the wall opening in such a way that when the first and second housing components are connected, an end-face pressing section of the first housing component is pressed against the sealing body.

* * * * *